United States Patent Office 3,031,445
Patented Apr. 24, 1962

3,031,445
NEW 16-OXYGENATED STEROIDS
Stefan Antoni Szpilfogel and Willem Jacobus Mijs, Oss, and Jan De Flines and Willem Frederik van der Waard, Delft, Netherlands, assignors to N.V. Organon, Oss, Netherlands, and De Koninklijke Nederlandsche Gist- En Spiritusfabriek N.V., Delft, Netherlands, both corporations of the Netherlands
No Drawing. Filed Mar. 1, 1961, Ser. No. 92,475
Claims priority, application Netherlands Mar. 14, 1960
2 Claims. (Cl. 260—239.55)

The invention relates to a process for the oxygenation of steroid compounds.

The process according to the invention is characterized in that by a chemical or microbiological method 16-oxygenated steroid compounds are prepared of the general formula:

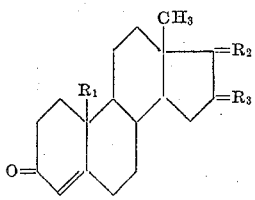

in which $R_1$=H or a methyl group
$R_2$=H($\beta$OH) or H($\beta$O Acyl), O, alkyl ($\beta$OH), or alkyl ($\beta$O Acyl),
$R_3$=H($\beta$OH), H($\beta$O Acyl), or
$R_2$ and $R_3$ together a 16,17-acetal-, or -ketal group.

The compounds according to the invention are important on account of their biological activity.

From pharmacological experiments it has appeared that the present compounds have i.a. an oestrogenic and uterotropic activity.

They can be obtained in various manners starting from other steroid compounds. One of these methods is characterized in that $\Delta^4$-3-keto-androstene compound or a $\Delta^4$-3-keto-19-nor-androstene compound is brought into contact with an in 16$\beta$-position oxidising fungus or an oxidising enzyme system obtained therefrom.

For the 16-oxygenation of the present steroids fungi of various orders can be applied. In particular the fungi belonging to the order Moniliales have appeared to be quite suitable and that especially the genus Curvularia, such as C. lunata, the order Sphaeriales, such as the species Mycosphaerella fragariae and Mycosphaerella latebrosa, the order Melanconiales, such as the species Colletotrichum phomoides and Colletotrichum lindemuthianum and the group Mycelia of the Fungi Imperfecti, such as the species Sclerotium coffeicolum.

The process according to the invention is carried out in the manners known for analogous microbiological conversions by bringing the substrate, in conditions suitable for that purpose, into contact with the enzyme system of the relative fungus. For that purpose first a culture of the relative fungus is, for example, allowed to develop in a culture medium under aerobic conditions, after which a fermentation medium containing the steroid to be modified, is subjected to the bio-oxygenating action of the mycelium formed.

The culture medium chiefly consists of a carbon and nitrogen source, for example, a carbohydrate, such as glucose, maltose or starch and an organic nitrogen source, such as corn steep liquor, yeast extract, meat extract or an inorganic nitrogen source, such as ammonium salts or alkali metal nitrates.

Furthermore an anti-foaming agent, such as glyceryl-mono-stearate, is in most cases also added to the fermentation medium, which contains the steroid to be oxygenated and one or more of the above-mentioned nutrients.

The temperature employed in the microbiological oxidation of the steroid is usually between 20 and 28° C., although higher or lower temperatures, for example those between 15 and 45° C., are suitable.

The time required for the oxidation of the steroid varies widely, but usually an oxygenation period of from 10 to 72 hours is sufficient.

The 16$\beta$-hydroxy compound obtained after completion of the fermentation process can be obtained from the fermentation medium in one of the common manners, for example by chromatography, extraction or combinations thereof.

The compounds according to the invention can also be prepared from other steroids by a chemical method.

One of the methods is characterized in that a 3-ether of 16-epi-oestriol or a 16,17-derivative thereof is taken as starting material, which compound is reduced to the 16$\beta$-hydroxy-19-nor-testosterone or a 16,17-derivative thereof by means of an alkali metal in liquid ammonia by the method described by A. J. Birch in J. Chem. Soc., page 367 (1950).

Another chemical method is characterized in that a 17-keto compound of the androstane or 19-nor-adrostane series is taken as starting material and converted into the corresponding 16-oximino compound, which by reduction, with for example zinc and acetic acid, is reduced to a 16-keto compound, which latter compound is reduced again to the desired 16$\beta$-hydroxy compound with, for example, hydrogen in the presence of a platinum catalyst.

Another chemical method is characterized in that a 17-keto-steroid is enolacylated, whereupon the thus obtained $\Delta^{16}$-17-acyloxy compound is treated with lead tetra-acetate to form the corresponding 16$\beta$-acyloxy-17-keto-steroid. By reduction with, for example, lithium aluminium hydride the 16$\beta$,17$\beta$-dihydroxy-steroid compound is obtained from it.

The 16$\beta$-acyloxy-17-keto compound obtained can also first be converted into the corresponding 17-hydroxy-17-alkyl compound by an addition reaction and after that into the corresponding 16$\beta$-hydroxy compound by hydrolysis.

If desired, the thus obtained steroid compounds can be converted into the functional derivatives thereof, especially to the 16,17-diesters, or 17-mono-esters if a 16-keto-17$\beta$-hydroxy steroid compound has been obtained. The 16,17-dihydroxy compounds can also be converted into the corresponding 16,17-acetals or -ketals, for example, the 16,17-acetonide.

In the esterification it is preferred to apply a carboxylic acid with 1–30 carbon atoms. It is also possible to use a functional derivative of the carboxylic acid, for example the acid anhydride or an acid halide.

As examples of acids to be used are mentioned: acetic acid, propionic acid, butyric acid, trimethyl acetic acid, valeric acid, caproic acid, caprylic acid, capric acid, undecylic acid, lauric acid, palmitic acid, stearic acid, undecylenic acid, oleic acid, hexahydrobenzoic acid, cyclopentylpropionic acid, cyclohexylbutyric acid, phenyl acetic acid, phenyl propionic acid, succinic acid, glutaric acid, tartaric acid and carbamic acid.

The esterification can be carried out by any method known per se, for example by reaction with the acid anhydride or the acid halide, preferably in the presence of a tertiary base, such as pyridine or quinoline and, if desired, in the presence of a suitable solvent, such as ether, dioxane or benzene.

The 16,17-acetals, or 16,17-ketals of the present

16β,17-dihydroxy compounds can be prepared by reacting the steroid with an aldehyde, such as formaldehyde or benzaldehyde, or a ketone, such as acetone, diethylketone or acetophenone under anhydric conditions and in the presence of a catalyst, such as copper sulphate, hydrogen chloride gas or perchloric acid.

The invention is illustrated by the following examples.

Example I

A culture medium containing 20 g. of evaporated corn steep liquor and 20 g. of glucose per 1,000 ml. of distilled water was, after adjustment at pH 6.5 (sodium hydroxide solution) and sterilisation for 20 minutes at a temperature of 120° C., inoculated with a culture of *Mycosphaerella latebrosa*, grown on malt agar, per portion of 500 ml. in shaking flasks of 2,000 ml. content.

These inoculated cultures were shaken 5×24 hours at 26° C. on a rotating shaking machine (300 rev./min.), after which the mycelium formed was passed from two shaking flasks into a 30 l. stainless steel fermentation tank, fitted with stirrer and aerator, containing the following fermentation medium sterilised under the above conditions:

Corn steep liquor (calculated on the basis of dry
  substance) _____ g__ 75
Glucose _____ g__ 75
Anti-foaming oil _____ g__ 15
Distilled water to _____ l__ 15
pH=6.5 (sodium hydroxide solution).

After 48 hours' stirring and exposure to air (number of revolutions 200/min.; air supply 10 l./min.) at 26° C., 6 g. of 19-nor-testosterone suspended in 100 ml. of sterile water were added to the fermentation medium under aseptic precautions. After that fermentation was continued for another 72 hours and then stopped. The thus obtained fermentation liquid was freed from the mycelium by filtration and the clear culture filtrate extracted with 4 x 4,000 ml. methyl isobutyl ketone.

Then the extract was evaporated in vacuo to 750 ml. and then washed with respectively 75 ml. of NaOH-solution 0.1 N, 75 ml. of distilled water, 75 ml. of hydrochloric acid 0.1 N and 3 times 75 ml. of distilled water, after which the thus treated extract was entirely evaporated to dryness in vacuo.

The solid residue (4.05 g.) was then subjected to a countercurrent extraction (toluene/50% methanol 1:1) to obtain after 96 transports a complete separation of the oxygenated steroid. The contents of the tubes 25 to 45 inclusive were evaporated to obtain 2.01 g. of crystalline product with a melting point of 149–151° C. This product was purified by crystallisation from methyl isobutyl ketone. This treatment yielded 1.44 g. of pure 16β-hydroxy-19-nor-testosterone with a melting point of 154–155° C.

$R_f$-values:
  System toluene-70% methanol (Whatman No. 1)= 0.50.
  System chloroform-formamide (Whatman No. 1)= 0.78.

After further concentration another 0.40 g. of final product with a melting point of 152–154° C. were obtained from the mother liquor.

By the method described in this example the 17α-ethyl-19-nor-testosterone was converted to the corresponding 16β-hydroxy compound by means of *Mycosphaerella latebrosa*.

Example II 0.5 g. of 16-epi-oestriol is dissolved in 50 ml. of methanol to which 10 ml. of 2 N NaOH are added. Then 0.95 ml. of dimethyl sulphate in 5 ml. of ethanol are added dropwise in 10 minutes. Next the mixture is refluxed for 5½ hours. Then 1 g. of NaOH, dissolved in 100 ml. of water, is added, whereupon the mixture is cooled to room temperature and the precipitate is filtered off. The residue is washed with 2 N NaOH and with water and then recrystallised from methanol. Yield 350 mg. The filtrate is shaken out with chloroform, the chloroform layer washed with 2 N NaOH, next with water until neutral reaction and finally dried and evaporated. From it another 35 mg. of substance were recovered.

300 mg. of the thus obtained 3-methyl ether of 16-epi-oestriol are dissolved in 7 ml. of dioxane and 7 ml. of tetra-hydrofurane and slowly added dropwise, while stirring, to a solution of 2.5 g. of lithium in 200 ml. of liquid ammonia. After the addition of the lithium stirring is continued for 30 minutes. The temperature is kept at −60° C. The ammonia is evaporated, to the residue 100 ml. of water are added and the mixture is shaken out with chloroform. The organic layer is separated, washed with $Na_2CO_3$ and with water, dried and evaporated to dryness. The residue is dissolved in 30 ml. of tetrahydrofurane and after adding 7 ml. of 2 N hydrochloric acid refluxed for one hour. After that 80 ml. of ice water are added and extraction takes place with chloroform, the organic layer is washed with $Na_2CO_3$-solution and with water, dried and evaporated until dry. The residue is chromatographed over aluminium oxide and recrystallised from acetone-hexane. Yield 208 mg. of 16β-hydroxy-19-nor-testosterone. Melting point 154–156° C.

*Analysis.*—Found 74.57% C; 9.01% H. Calculated for $C_{18}H_{26}O_3$: 74.44% C; 9.03% H. $[\alpha]_D=+51°$ (in chloroform).

Example III 50 mg. 16β-hydroxy-19-nor-testosterone are dissolved in 14 ml. of acetone; while stirring vigorously 1 drop of 65% perchloric acid solution is added. The mixture is stirred for 10 minutes at room temperature, after which 50 ml. of water are added. The reaction mixture is extracted with chloroform, the organic layer washed with $Na_2CO_3$-solution and with water. The solution is dried with $Na_2SO_4$ and evaporated until dry. The residue is recrystallised from acetone-cyclohexane. Yield 40 mg. of 19-nor-testosterone 16,17β-acetonide. Melting point: 116–118° C. $[\alpha]_D=73°$ (chloroform).

Example IV 100 mg. of 16β-hydroxy-19-nor-testosterone are dissolved in 1 ml. of pyridine and 0.6 ml. of acetic anhydride. The solution is kept at room temperature for one night, after which it is poured into ice. To the aqueous mixture 2 ml. of 4 N HCl are added and the mixture is kept at room temperature for two hours. After that extraction takes place with chloroform. The organic layer is washed with a cold $Na_2CO_3$-solution and with water. The solution is dried and the solvent evaporated until dry. Yield 100 mg. of 16β,17β-diacetoxy-Δ⁴-3-keto-19-nor-androstene.

Analogously the 16,17-diesters are prepared, derived from trimethyl acetic acid, cyclopentyl propionic acid, phenyl propionic acid, capric acid, palmitic acid and succinic acid.

Example V

A culture medium consisting of 5 g. of malt extract, 10 g. of glucose, 10 g. of soya-meal, 5 g. of sodium chloride, 5 g. of evaporated corn steep liquor, 1. g. of calcium carbonate and completed with tap water to 1 litre, is sterilised for 30 minutes at a temperature of 120° C. and then inoculated with a culture of *Curvularia lunata* (Ramoen.a. strain).

This culture is shaken on a shaking apparatus (120 revolutions/minute) for 5 days at 24° C., after which 10 ml. of a solution of Δ⁴-3-keto-17α-methyl-17β-hydroxyandrostene in acetone are added to 1 litre of culture medium. The solution is incubated for 80 hours at a temperature of 24° C., after which the culture medium is filtered and the mycelium washed with acetone. After that filtrate and mycelium are extracted with chloroform, the chloroform extracts are washed with a sodium bicarbonate solution, then with water, dried on sodium sulphate and evaporated to dryness. With the residue a counter-current reaction is carried out with toluene 50% methanol to obtain the Δ⁴-3-keto-17α-methyl-16β,17-dihydroxy-androstene and the Δ⁴-3,16-diketo-17α-methyl-17β-hydroxy-androstene.

In accordance with the process described above the 17α-allyl-19-nor-testosterone is converted into the corresponding 16β-hydroxy-compound by means of *Colletotrichum phomoides* and the Δ⁴-3-keto-17α-propyl-17β-hydroxy-androstene to the corresponding 16β-hydroxy-compound by means of *Sclerotium coffeicolum*.

*Example VI*

To a solution of 0.75 g. of Δ⁵-3-hydroxy-17-keto-androstene in 10 ml. of isopropenyl acetate 0.5 ml. of sulphuric acid are added, after which the solution is boiled for two hours. Next another 10 ml. of isopropenyl acetate and 0.5 ml. of sulphuric acid are added, after which the reaction mixture is boiled for another two hours and at the same time evaporated to a small volume. The solution is then diluted with ether, the ether layer is separated, washed with a sodium carbonate solution and water, dried on sodium sulphate and then evaporated until dry. The residue is recrystallised from a mixture of acetone and petroleum ether to obtain the Δ⁵,⁶-3,17-diacetoxy-androstadiene.

To a solution of 1 g. of this compound in 20 ml. of glacial acetic acid and 1 ml. of acetic anhydride is added 1.25 g. of lead tetra-acetate. The solution is stirred for 24 hours at room temperature and then evaporated in vacuo until dry. The residue is dissolved in benzene, washed with a sodium bicarbonate solution and with water, dried on sodium sulphate and evaporated until dry. The residue is recrystallised from petroleum ether to obtain the Δ⁵-3β,16β-diacetoxy-17-keto-androstene.

This compound is dissolved in 75 ml. of ether and added to a suspension of 30 mg. of lithium aluminium hydride in 35 ml. of ether. The suspension is refluxed for 90 minutes, after which ethyl acetate is added to the mixture. The ether solution is washed with water, dried on sodium sulphate and evaporated until dry. The residue is recrystallised from aqueous methanol to obtain the Δ⁵-3β,16β,17β-trihydroxy-androstene.

To a warm solution of 1 g. of this compound in a mixture of 45 ml. of toluene and 5 ml. of cyclohexanone is added dropwise a solution of 6 ml. of aluminium isopropoxide, in 10 ml. of toluene. The solution is refluxed for half an hour, after which a solution of 4 g. of sodium potassium tartrate in 15 ml. of water is added to it. The mixture is subjected to a steam distillation and then extracted with chloroform. The chloroform layer is washed with a NaCl-solution, dried on sodium sulphate and evaporated in vacuo until dry. The residue is crystallised from methyl isobutyl ketone to obtain the Δ⁴-3-keto-16β,17β-dihydroxy-androstene.

We claim:
1. New steroids of the general formula:

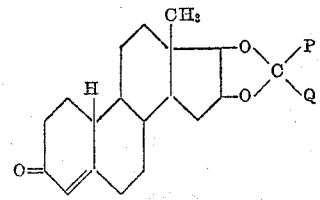

in which P and Q are selected from the group consisting of hydrogen, methyl and ethyl.

2. The new compound of the formula:

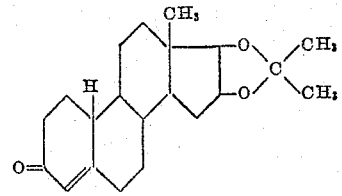

References Cited in the file of this patent

Drill et al.: Recent Progress in Hormone Research (1958), vol. 14, pages 26–76 (page 61 relied on).
Bernstein et al.: J.A.C.S., vol. 81, page 4573, Sept. 5, 1959.
Allen et al.: J.A.C.S., vol. 81, pages 4968–4979, Jan. 24, 1959.